Patented Feb. 4, 1936

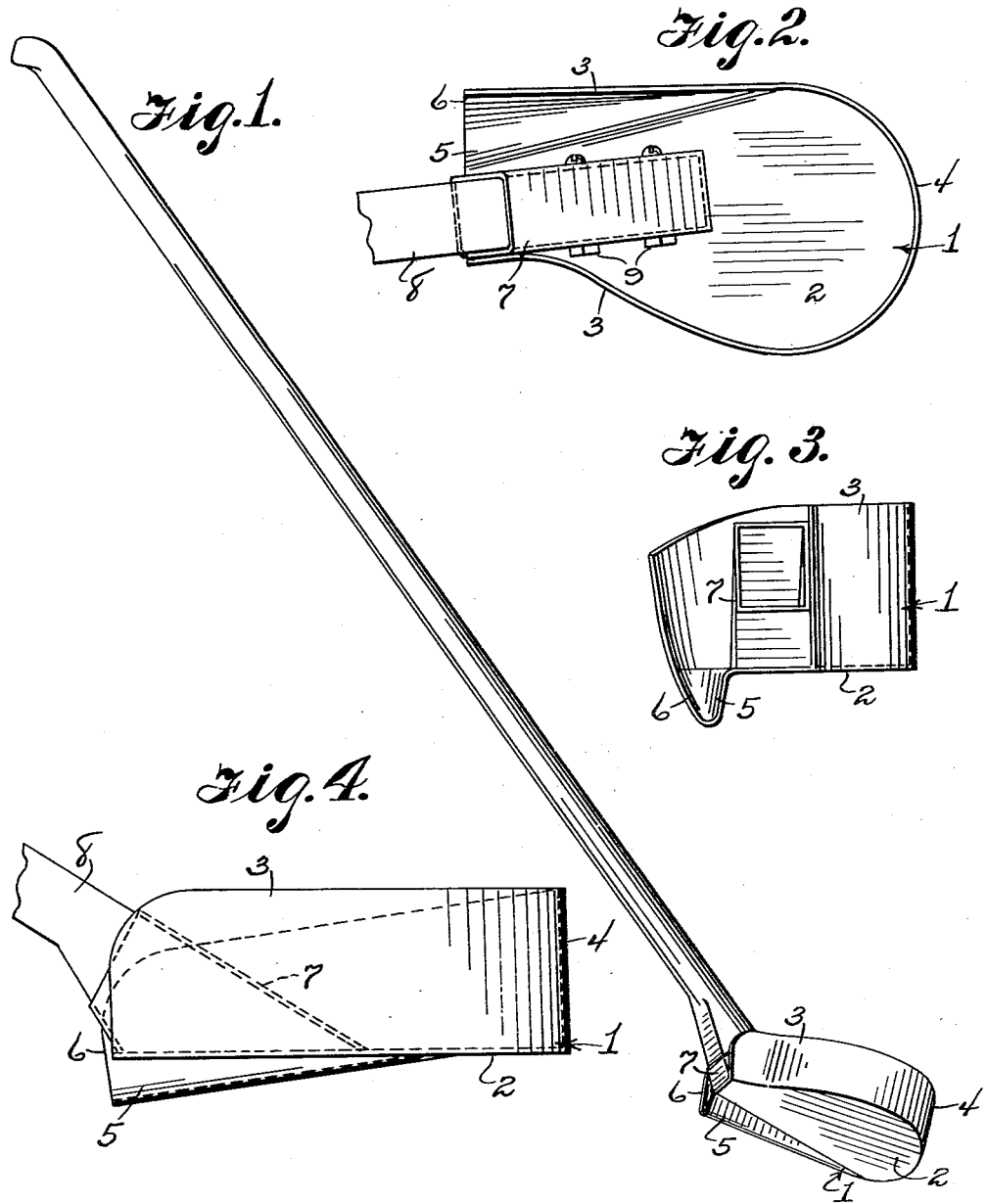

2,029,949

UNITED STATES PATENT OFFICE 2,029,949

LAWN EDGER

Charles S. Scott, Bluffton, Ind.

Application April 8, 1935, Serial No. 15,339

1 Claim. (Cl. 97—227)

My invention relates to improvements in lawn trimming implements more particularly lawn edgers, so called, for trimming along the edges of a walk, pavement or the like.

The principal object of my invention is to provide a simply constructed efficient implement of this class which may be readily drawn along the edge of a pavement or a walk to dig a trench in the lawn along said edge and which is particularly adapted for fitting against the edge of a pavement or walk so that the said edge may be used as a track to guide the course of the implement.

Another object is to provide an implement for the purposes above set forth which is adapted to scoop up the earth dug from the trench.

Still another object is to provide such an implement which is inexpensive to manufacture, light in weight and durable.

Other and subordinate objects will presently appear when the following description and claim are read in conjunction with the drawing accompanying and forming a part of this specification.

In said drawing:

Figure 1 is a view in perspective of my improved implement.

Fig. 2 is a view in top plan, drawn to an enlarged scale, and with the handle broken away.

Fig. 3 is a detail view in rear elevation, and,

Fig. 4 is a side elevation with the handle broken away.

Referring to the preferred embodiments of my invention illustrated in the drawing, my improved implement comprises a scoop 1 formed of sheet metal and having a substantially flat bottom wall 2 and side and front walls 3 and 4, respectively, said scoop being open at its top and rear end. Preferably the front end of the scoop 1 is rounded in transverse section and wider than the remaining part of the scoop and one side edge is straight as shown in Figure 2 for a purpose presently seen.

Extending along the straight side edge of the scoop and depending from the bottom wall 2 is a trough shaped rib 5 inclining downwardly and rearwardly. Said rib is open at its rear end and provided at said end with cutting edges 6 and forms a trench digging scoop portion as will be clear.

Arising from the bottom wall 2 at one side of the rib 5 is a socket member 7 secured to said bottom wall in any suitable manner and in which the lower end of the handle 8 is secured by bolts 9. The handle 8 inclines upwardly and rearwardly from the scoop 1 and also as shown in Figure 2 is inclined laterally of the scoop for a purpose presently explained.

In using my improved implement the cutting edge 6 is first inserted in the ground alongside of one edge of the walk or pavement with the bottom wall of the scoop overlying said pavement. The implement is then drawn along the edge of said walk with the flat wall 2 sliding on said walk and the rib 5 in contact with said edge. As the trench is dug the earth dug therefrom is forced through the inclined rib into the scoop 1 and may be dumped therefrom into any suitable receptacle. By virtue of the described lateral inclination of the handle 8 the person using the implement may walk on the pavement and thereby avoid trampling on the grass. If desired the implement may be shoved in a forward direction to smooth the sides of the trench, the inclination of the rib 5 facilitating this operation. When the implement is moved forwardly its rounded front end acts as a wedge facilitating movement of said implement through leaves or other matter which may have collected on the pavement or walk.

Although I have described a preferred embodiment of my invention it is to be understood that right is herein reserved to changes and modifications following within the scope of the claim appended hereto.

What I claim is:

An implement of the class described comprising a scoop having a flat bottom wall, a rounded front wall and side walls and open at its top and rear end, said scoop being formed along one side edge thereof with a trough shaped rib depending from said bottom wall and inclining downwardly and rearwardly, said rib being open at its rear end and provided at said end with cutting edges, a socket member secured in said scoop to said bottom wall at one side of said rib, and a handle secured in said socket and inclining upwardly and rearwardly and also laterally of said scoop.

CHARLES S. SCOTT.